No. 815,019. PATENTED MAR. 13, 1906.
O. KAMPFE.
HOOK.
APPLICATION FILED AUG. 23, 1905.
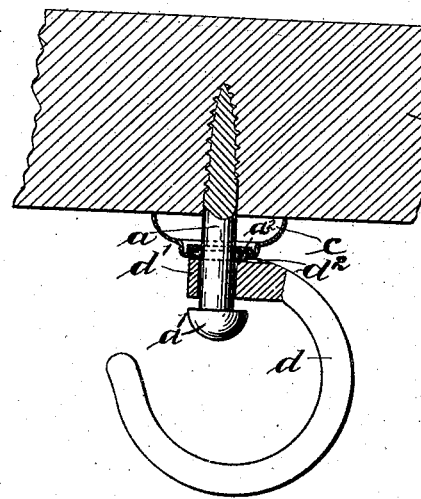
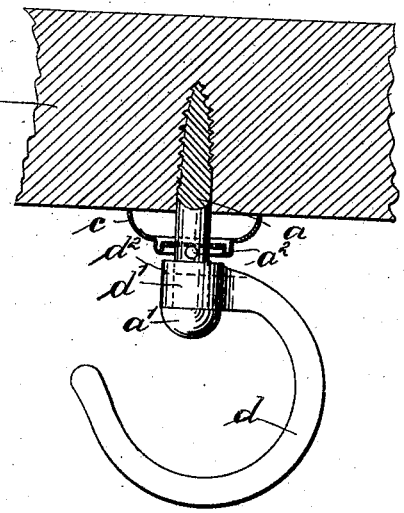
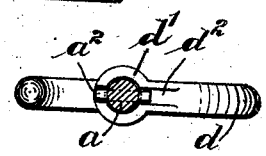
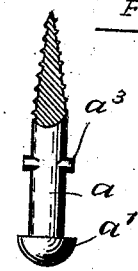
WITNESSES
Leopold Leer
Chas. H. Smith
INVENTOR
Otto Kampfe
PER
Harold Serrell
ATTY

UNITED STATES PATENT OFFICE.

OTTO KAMPFE, OF NEW YORK, N. Y.

HOOK.

No. 815,019.  Specification of Letters Patent.  Patented March 13, 1906.

Application filed August 23, 1905. Serial No. 275,371.

*To all whom it may concern:*

Be it known that I, OTTO KAMPFE, a citizen of the United States, residing in the borough of Brooklyn, in the county of Kings, city and State of New York, have invented an Improvement in Hooks, of which the following is a specification.

My invention relates to a hook adapted to be secured in a shelf against the under side and suitable for the suspension of articles of wearing-apparel and personal use and such china, bric-à-brac, &c., as is provided with a handle or suspending member, with the object of giving the desired position or relation to the article suspended without unscrewing or unnecessarily tightening the hook.

In the device of my invention I employ an attaching-screw, about which the hook member is revoluble. The attaching-screw has a head at its outer end, and a pin passes through the stem of the screw, or the same is made with offset lugs distant from the head slightly greater than the depth of the shank of the suspending-hook, which shank surrounds and is revoluble upon the stem of the screw and is provided with recesses at opposite sides to receive the pin or lugs. I provide a washer of any desired form or ornamentation adapted to come between the pin or lugs and the under surface of the shelf or object to which the screw is connected, which is held to place by the pin or lugs. The same taking against the face of the washer limits the amount to which the screw is inserted in the shelf and determines the extent that it projects below the washer. To insert the screw, a hole is bored in the wood and the screw is inserted and turned to place by the shank, the recesses of the hook-shank engaging the pin or lugs and turning the screw. When the screw is in place and the hook released, it falls by gravity against the head of the screw, where it is supported and is free to be turned independent of the pin or lugs.

In the drawings, Figure 1 is a vertical section and partial elevation representing the device of my invention with the shank of the revoluble member engaging the pin in the act of connecting the screw to the shelf. Fig. 2 is a sectional plan showing the pin in the recesses of the hook-shank. Fig. 3 is a vertical section and partial elevation of the devices in the gravity position assumed when the revoluble member is released after inserting the hook in the shelf; and Fig. 4 is an elevation of the screw-stem, showing lugs formed therewith in lieu of a pin passing through the same.

The stem $a$ is screw-threaded at one end and provided with a head $a'$ at the opposite end. As shown in Figs. 1, 2, and 3, the stem is transversely perforated to receive a pin $a^2$ at an appreciable distance from the head, or, as shown in Fig. 4, lugs $a^3$ may be stamped up of the metal of the screw-stem.

$b$ represents the shelf, into which from the under surface the screw-stem $a$ is driven.

$c$ represents a washer of transversely-curved disk form. The same may be made plain or ornamental or of any desired outline. The same is, however, preferably recessed in its outer face to partially receive the pin $a^2$ or the lugs $a^3$.

$d$ represents the hook member or revoluble part, having a shank $d'$, which surrounds and is free to turn upon the stem $a$. I prefer that the diameter of the shank shall not exceed the inner diameter of the recess of the washer, said shank being provided on its upper face with opposite recesses $d^2$ of a width sufficient to receive the pin $a^2$ or the lugs $a^3$.

To insert the screw-stem into a shelf from the under side, a hole is preferably bored in the wood, the hook $d$ taken in the hand, and the pin or lugs thereof brought into the recesses of the hook-shank. In this position when the threaded end of the stem $a$ is inserted in the wood and the hook turned by hand the screw-stem is driven to position until the pin $a^2$ or the lugs $a^3$ of the stem come against the outer face of the washer with the rim of the washer against the under surface of the wooden shelf. This indicates that the screw-stem has been forced to place and that no further turning movement is necessary, and in this position the washer is held in place by the screw-stem and the pin or lugs. If now the hook is released, it falls by gravity into the position Fig. 3, where the under surface of the shank rests upon the head $a'$. In this position the hook is supported, it is clear of the pin or lugs, and may be freely rotated about the screw-stem, and from this it will be apparent that the hook may be turned to receive articles to be suspended thereby and may then be turned into any position desired. It is also apparent that the relation of the pin or lugs to the edge of the shelf, fixing the connected relation of the screw-stem to the shelf, bears no relation to the position that the revoluble hook member may bear either to the edge of the shelf or to the article suspended, the revoluble condition thereof making possible any desired position of the hook.

I claim as my invention—

1. A hook comprising a screw, a hook member and shank surrounding and connected thereto and revoluble about the screw and interposed engaging and coacting devices by means of which the screw may be turned by the revoluble member to connection with a support and thereafter the release of the revoluble member permits the same to move slightly along the screw and to be freely turned by hand about the screw-stem.

2. A hook comprising a screw, a hook member and shank surrounding and connected thereto and revoluble about the screw and interposed engaging and coacting devices in part on each member by which the screw may be turned and connected to a support or the revoluble member be free to be turned.

3. A hook comprising a stem, threaded at one end and having a head at the opposite end, a hook part and shank surrounding said stem and revoluble about the same, said shank having opposite recesses in its upper face, and devices associated with the stem and adapted to be received by the recesses, by which, when the revoluble member is grasped by the hand, the stem may be turned to connect the hook to a shelf or other support.

4. A hook comprising a stem, threaded at one end and having a head at the opposite end, a hook part and shank surrounding said stem and revoluble about the same, said shank having opposite recesses in its upper face, and a pin passing transversely through a hole in the stem and adapted to be received by the recesses by which, when the revoluble member is grasped by the hand, the stem may be turned to connect the hook to a shelf or other support.

5. A hook comprising a stem, threaded at one end and having a head at the opposite end, a hook part and shank surrounding said stem and revoluble about the same, said shank having opposite recesses in its upper face, and a pin passing transversely through a hole in the stem and adapted to be received by the recesses by which, when the revoluble member is grasped by the hand, the stem may be turned to connect the hook to a shelf or other support, and a washer interposed between the pin and the under surface of the shelf or support surrounding the screw-stem, and provided with a recess in the outer face partially receiving the pin and concealing the same from view.

Signed by me this 18th day of August, 1905.

OTTO KAMPFE.

Witnesses:
GEO. T. PINCKNEY,
S. T. HAVILAND.